UNITED STATES PATENT OFFICE.

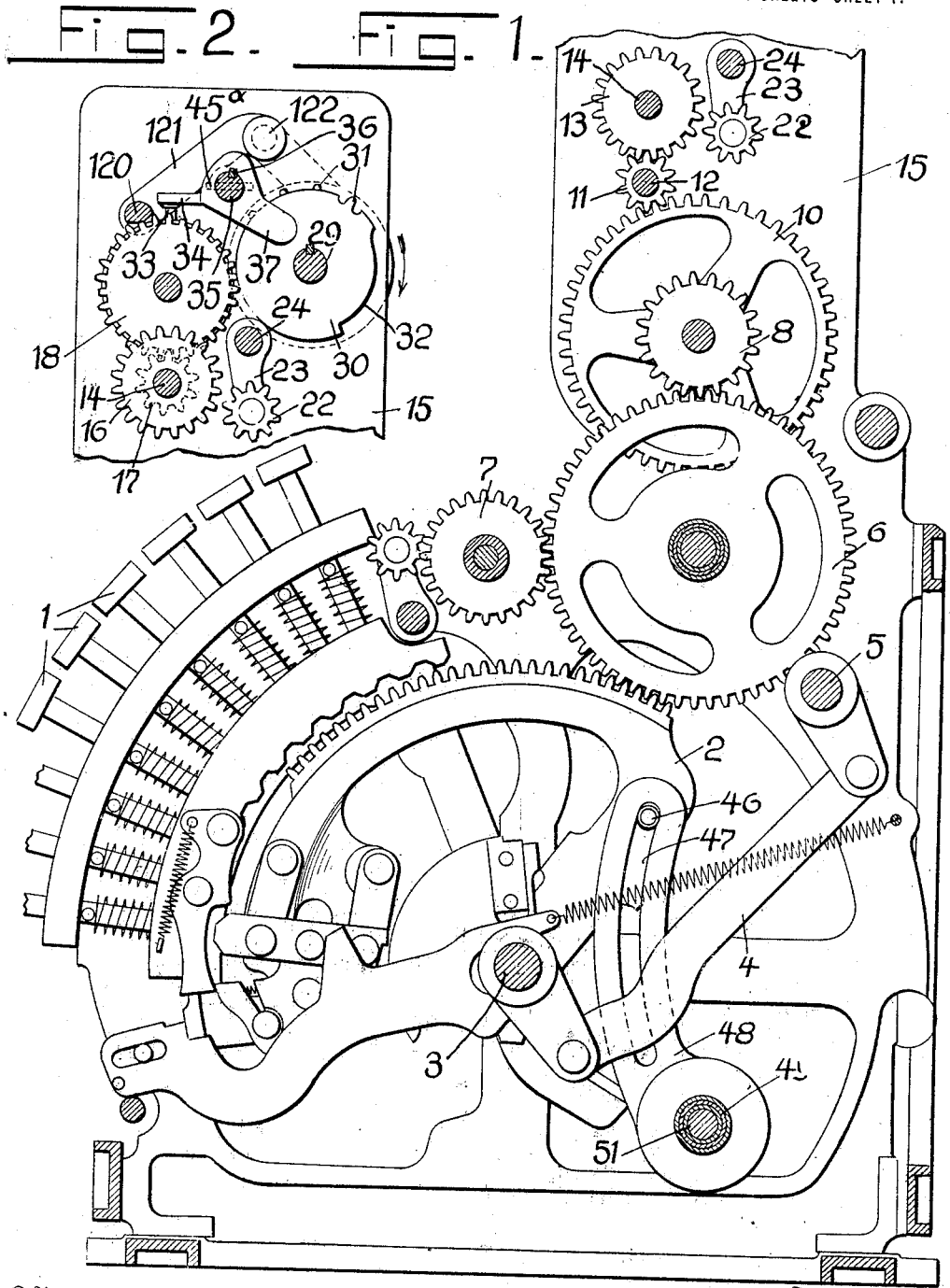

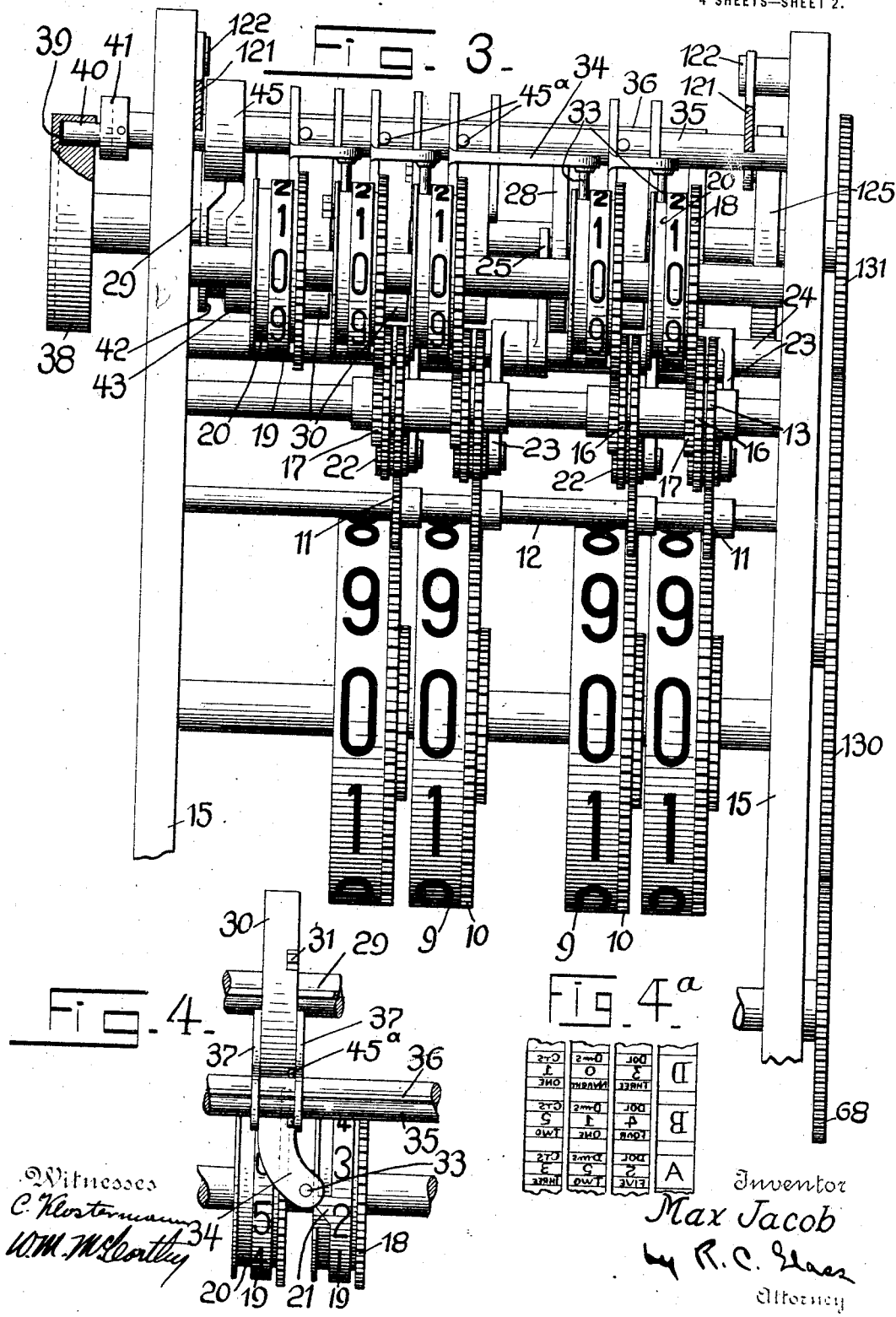

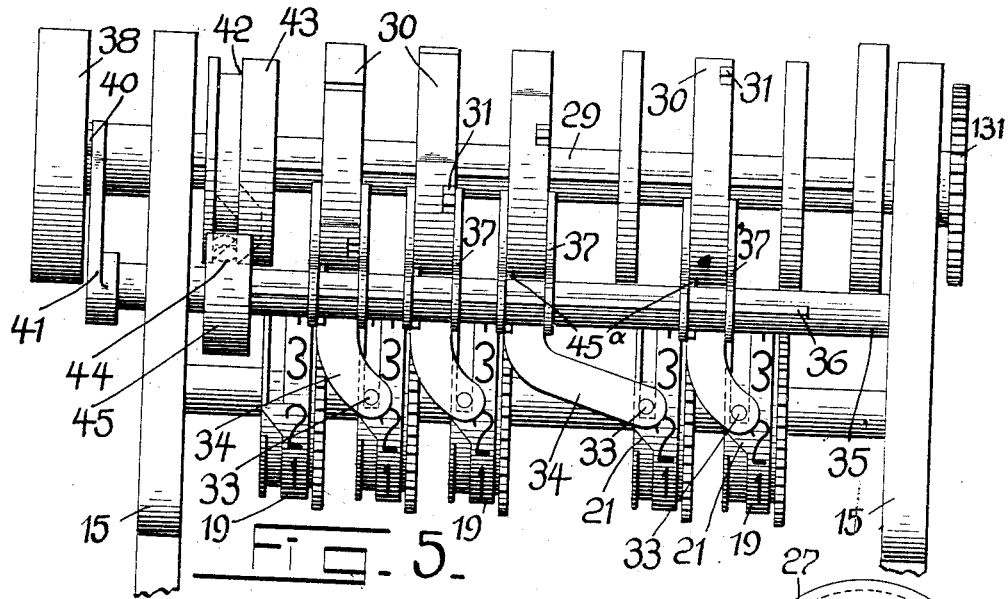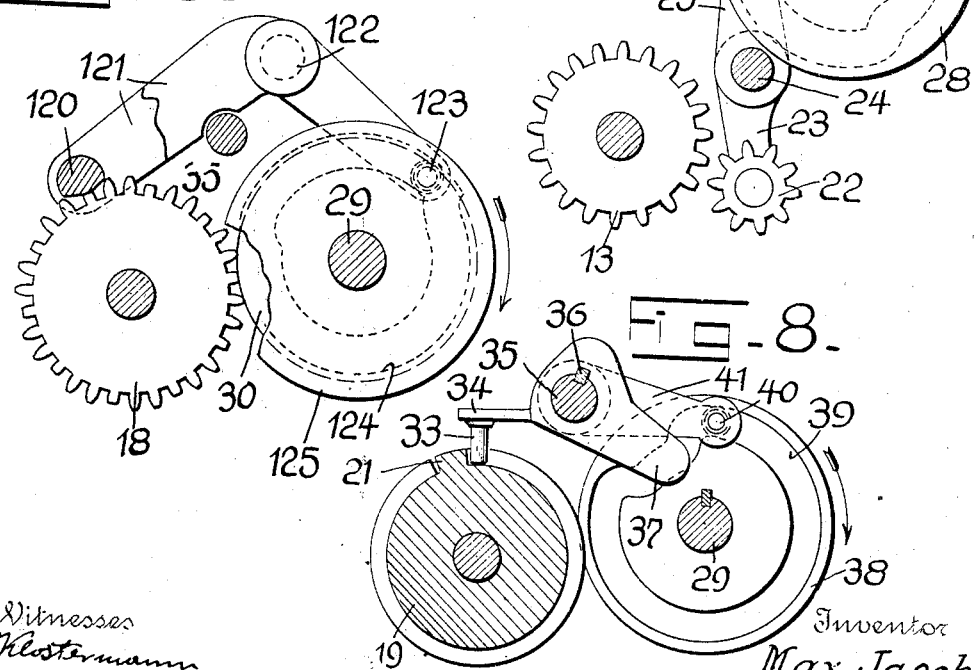

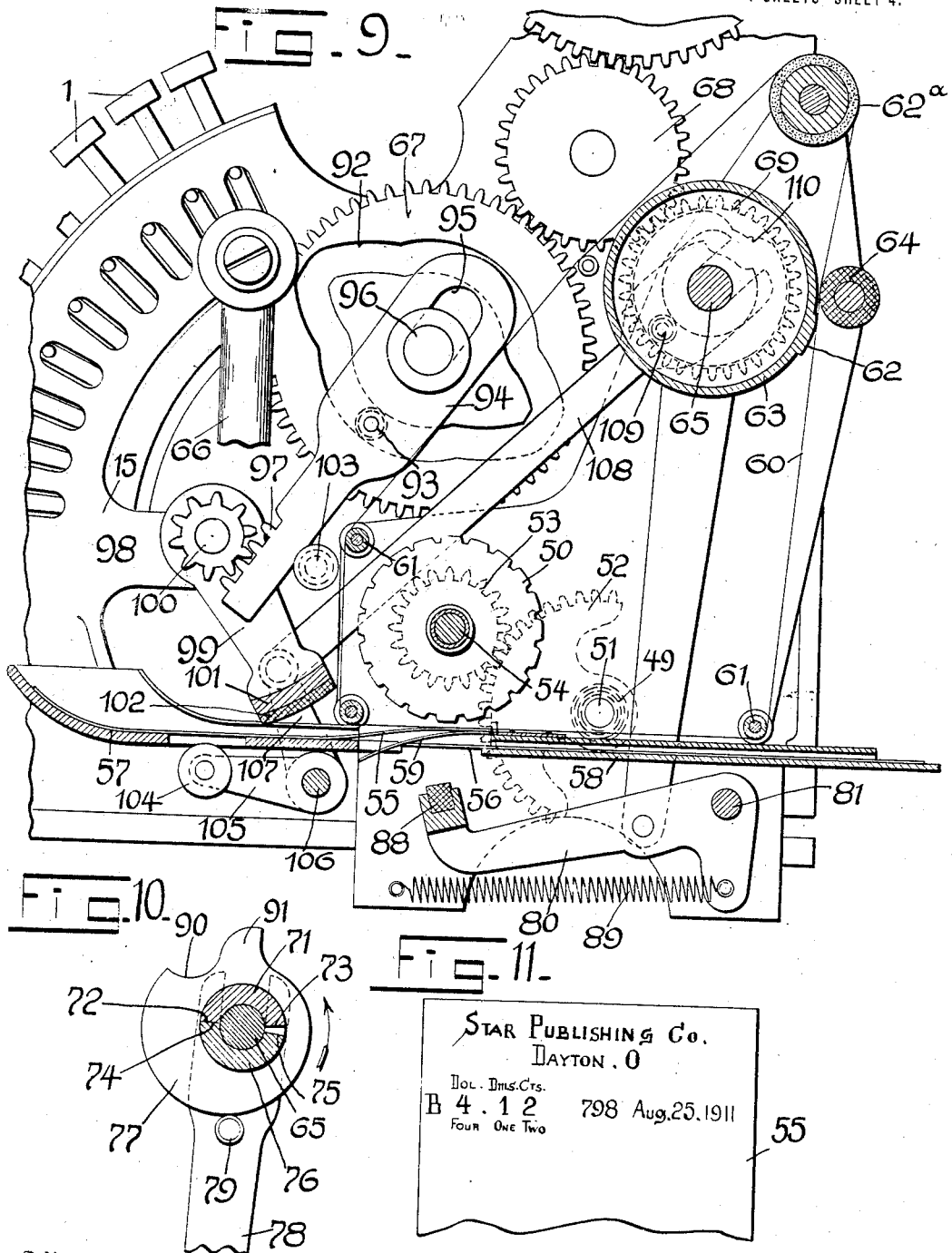

MAX JACOB, OF BERLIN, GERMANY, ASSIGNOR TO THE NATIONAL CASH REGISTER COMPANY, OF DAYTON, OHIO, A CORPORATION OF OHIO, (INCORPORATED IN 1906.)

CASH-REGISTER.

1,153,309.  Specification of Letters Patent.  Patented Sept. 14, 1915.

Application filed October 3, 1911. Serial No. 652,557.

*To all whom it may concern:*

Be it known that I, MAX JACOB, a subject of the Emperor of Germany, residing at Berlin, Germany, in the Kingdom of Prussia and Empire of Germany, have invented certain new and useful Improvements in Cash-Registers, of which I declare the following to be a full, clear, and exact description.

This invention relates to accounting machines and its principal object is to provide such machines with an improved accumulator whereby the elements of said accumulator are at all times locked except when under the control of the actuators therefor and the transfer devices coöperating with said elements.

Another object of this invention is to provide an improved recording mechanism whereby an impression is made upon a slip from a set of type carriers and the slip then fed so that a duplicate impression may be made upon a second slip.

A further object of this invention is to provide an improved form of type carriers which in addition to printing the digit, print the word designating the digit recorded and also a character indicating the denominational value of the recorded digit. By printing these characters in juxtaposition to the digit it reduces to a minimum the danger of altering the recorded digit without detection.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 1 is a transverse sectional view partly broken away of a machine of a well known type with the improvements applied thereto. Fig. 2 is a transverse sectional view through the improved accumulating mechanism which is the part broken away from Fig. 1. Fig. 3 is an enlarged front elevation of the upper portion of the machine showing the indicators and the improved accumulator. Fig. 4 is a partial top plan view of two of the accumulating elements and the transfer device between same, said transfer device being shown in its adjusted position. Fig. 4$^A$ is a detail of the type carrying wheels partly broken away, showing the arrangement of the type on the printing faces. Fig. 5 is a top plan view of the accumulator and the transfer devices between the elements thereof, all of said transfer devices being shown in normal position. Fig. 6 is a detail view showing the alining bar for the accumulator elements and the operating cam for said bar. Fig. 7 is a detail view of one of the coupling pinions and the operating cam therefor, which pinions are used for coupling the actuators and the accumulating elements. Fig. 8 is a detail view of the mechanism for rocking the shaft carrying the means for shifting the transfer devices, whereby said transfer devices and shifting means are permitted to be returned to normal position. Fig. 9 is a side elevation partly broken away of the improved recording mechanism. Fig. 10 is a detail view of the operating cam for the impression mechanism. Fig. 11 is a detail view of one of the sales slips showing an impression taken from the improved type carriers.

These improvements have been shown as applied to a machine of the type well known on the market and which is exemplified in the following patents: Cleal and Reinhard No. 580,378 granted April 13, 1897 and Thomas Carroll No. 754,049 granted March 8, 1904 but it is to be understood that these improvements may be with equal facility applied to other well known types of machines.

The machine to which these improvements have been applied, as is fully shown and described in the aforementioned patents, comprises a plurality of banks of keys 1, each bank of which controls the differential movement of a segment 2, these segments being mounted upon a shaft 3, which is rocked by suitable connections 4 from a shaft 5, which is given a complete rotation upon each operation of the machine. Each of the segments 2 meshes with an enlarged gear 6, which in turn meshes with smaller gears 7 and 8 of the accumulating and indicating mechanisms respectively.

As hereinafter more particularly pointed out the improved machine is provided with two accumulators, upon one of which is accumulated the total sales of any desired period, such as a day, week or month, while the other accumulator is used for the purpose of accumulating the total of different items purchased by a customer, after which the last mentioned accumulator is cleared or reset to zero ready for the accumulation of another series of items.

The indicating mechanism comprises a plurality of disks 9 (Fig. 3) each having suitable indicia thereon, each disk also carrying a large gear 10. These gears 10 of the indicating disk mesh with pinions 11 loosely mounted upon a transverse shaft 12, these pinions in turn meshing with gears 13 loosely mounted upon a shaft 14 which is supported by side frames 15, which also support the previously mentioned shaft 12. Adjacent to each of the gears 13 is a similar gear 16 to which is fastened a pinion 17, these pinions 17 in turn meshing with gears 18 forming a part of the elements of the improved accumulator. In addition to the gear 18 each accumulating element comprises a disk 19, carrying a plurality of digits and having formed on the surface thereof a groove 20 having a cam portion 21 (Figs. 3, 4, and 5).

The gears 13 and 16 which are arranged in pairs are normally disconnected and each pair is arranged to be connected by a pinion 22 (Figs. 3 and 7), these pinions being carried by arms 23 extending downwardly from a rock shaft 24. This shaft 24, near the center thereof, has extending upwardly therefrom an arm 25, the upper end of which is provided with a roller 26, that plays in a cam groove 27 formed in a disk 28 secured to a shaft 29, which shaft is given a complete rotation upon each operation of the machine. The shape of the cam groove 27 is such that just previous to the actuating movement of the segments 2 controlled by the keys 1, said cam groove will rock the shaft 24 in such a manner as to carry the pinions 22 into engagement with the gears 13 and 16 so that the movement imparted to the actuating segments 2 will be transmitted through the indicating mechanism to the elements of the improved accumulator. This manner of connecting elements of the improved accumulator with the actuators is substantially identical to the manner employed in actuating the first mentioned accumulator which comprises the gears 7, which method is described in detail in the aforementioned Cleal and Reinhard patent.

Transfer disks 30, each having a single tooth 31, are splined to the rotary shaft 29 so that said disks may rotate with the shaft and yet have a lateral movement independent thereof. Certain of the teeth of the gears 18, which are part of the accumulating elements, are partially cut away, as shown in Figs. 2 and 6, so as to permit the rotation of the transfer disks 30 and at the same time lock the accumulating elements comprising the gears 18 from movement on account of the teeth adjacent to the cut away teeth contacting with the peripheries of the disks 30. These disks 30 are provided with cut away portions 32, which portions, when they present themselves to the gears 18, permit the operation of the accumulating elements of which said gears are a part. Just previous to the locking surfaces of the disks 30 passing out of engagement with the gears 18 the coupling pinions 22 are moved into engagement with the gears 13 and 16 and remain in engagement therewith while the cut away portions 32 of the disks 30 are passing the gears 18. During the time that the coupling pinions 22 are in engagement with the gears 13 and 16 the segments 2 are given their differential movements, which movements, as previously stated, are transmitted to both of the aforementioned accumulators. After the accumulating elements comprising the gears 18 and wheels 19 have been actuated by the movement of the segments 2, the locking surfaces of the disks 30 engage with the gears 18 and prevent further movement of said accumulating elements.

If any of the accumulating elements, during the actuation thereof, is moved a sufficient extent to bring the zero to reading position the cam portion 21 of said element will engage with a pin 33 projecting downwardly from an arm 34 and shift said arm laterally upon a shaft 35. Each of these arms, of which there is one for each accumulating element, is splined to the shaft 35 by a rib 36 which extends through flanges 37 struck up from said arm. The flanges of each arm extend rearwardly to each side of one of the transfer disks 30. From this it will be seen that as one of the accumulating elements passes from nine to zero it will cam the arm 34 laterally upon the shaft 35 and, through the flanges 37, shift its transfer disk. This shifting of the transfer disk brings its single tooth 31 into the same plane as the teeth of the gear 18 of the next higher accumulating element so that when said transfer disk is rotated its tooth 31 will engage with the teeth of the gear 18 and rotate the accumulating element to bring the next higher digit on said element into reading position. Previous to the engagement of the tooth 31 of the transfer disk 30 with the gear 18 the coupling pinions 22 will be disconnected from the gears 13 and 16 so that the additional movement imparted to the accumulating element will not be transmitted to its actuating segment 2. When the disks 30 are assembled on the shaft 29 the teeth 31 are spirally located upon the various disks 30 so as to effect the transfers successively in a manner well known in the art. These teeth 31 are struck up from the locking surfaces of the disks 30 so that immediately before the transfer and immediately thereafter the accumulating elements are locked from operation.

Upon the beginning of the succeeding operation of the machine the displaced arm 34 and its companion transfer disk 30 will be returned to their normal positions by the shifting of the shaft 35 supporting the arms 34. Previous to the shifting of the shaft 35 it is rocked so as to raise the pins 33 above the surface of the disks 19 of the accumulating elements so that when the displaced arm 34 is returned by the shifting of the shaft its pin 33 will be brought into position to enter its cam groove 20. This rocking and shifting of the shaft is accomplished as follows: Secured to the rotary shaft 29 is a disk 38, Fig. 8, having a cam groove 39 into which projects a roller 40 extending from an arm 41 secured to the shaft 35. Immediately upon the beginning of rotation of the disk 38 the shaft 35 will be rocked carrying all of the pins 33 above the surface of the disks 19. While the arms 34 are in this position the cam portion of a groove 42, Figs. 4 and 5, formed in a disk 43 will act upon a roller 44 projecting from a disk 45 secured to a shaft 35 and shift said shaft laterally. Projecting from the shaft 35 between the flanges 37 of each arm 34 is a pin 45ª which engages with one of the flanges of the displaced arm 34 as the shaft is shifted and thereby return said arm to normal position with its pin 33 in position to coöperate with the groove 20 of its companion accumulating element. This shifting of the displaced arm 34 will also return the displaced transfer disk 30 by the flanges 37. Immediately after being shifted the shaft 35 is rocked into its normal position by the cam disk 38 carrying the pins 33 of the arms 34 into their respective grooves 20.

While in normal position and until the pinions 22 couple the gears 13 and 16 forming a part of the actuating mechanism for the accumulating elements the latter are held in proper alinement by a bar 120, Fig. 6, which is supported by arms 121 pivoted to the side frames as at 122. One of these arms 121 extends rearwardly beyond its pivotal point and has extending from its extreme rearward end a roller 123, which plays in a cam groove 124 formed in a disk 125 secured to the rotary shaft 29. The timing of the cam disk 125 is such that immediately after the coupling of the accumulator elements to the actuating mechanism by the pinions 22 the alining bar 120 is withdrawn from the gears 18 and held in its withdrawn position until near the end of the rotation of shaft 29.

The accumulating mechanism located above the indicators is arranged to be used for the daily or weekly accumulator while the accumulator comprising the gears 7 is used for accumulating the total of a series of items that may comprise a purchase. This last mentioned accumulator is arranged to be cleared or reset to zero, after the items comprising a purchase have been accumulated thereon, by mechanism well known in the art and which is fully disclosed in the aforesaid Cleal and Reinhard patent.

The next feature of the invention to be described relates to the recording mechanism whereby an impression is taken upon a plurality of slips from a single set of type carriers, one of said slips being fed out of coöperative relation with the type carriers after an impression has been taken thereon so that an impression may be taken upon the second one of said slips.

In newspaper offices it is desirable where a person inserts an advertisement in the newspaper, that he be furnished with a copy of said advertisement with the cost thereof, the date of the advertisement and some suitable identifying character, such as a consecutive number, printed thereon while a duplicate of said copy is sent to the composing room to be set up. These duplicate copies are returned to the office from the composing room and kept on file so that in case a complaint is made of an error in any of the advertisements, it may be quickly checked up by comparing the copy held by the person making the complaint with the copy retained in the office.

The differential movements of the segments 2 are transmitted to a set of type carriers 50 (Fig. 9) by rollers 46 projecting from said segments, which play in elongated slots 47 formed in arms 48 fast to the inner ends of series of nested sleeves 49, which surround a transverse shaft 51. At their outer ends these sleeves 49 are provided with segments 52 which mesh with pinions 53 suitably secured to the type carriers 50, all of which is fully shown and described in the aforementioned Carroll patent. These amount type carriers 50 are loosely mounted upon a transverse shaft 54 which shaft has mounted thereon, adjacent to the amount type carriers 50, a set of consecutive numbering type wheels and additional type wheels for printing the date, neither of the latter type carriers being shown as their construction and manner of operation is well known in the art.

Previous to the operation of the machine, slips 55 and 56 are placed upon platforms 57 and 58, respectively, the former slip being placed upon its platform from the front of the machine with its upper end directly beneath the type carriers, while the latter strip is placed upon the platform 58 from the side of the machine with its lower end beneath the type carriers and the slip 55. The platform 58 for the slip 56 is provided with forwardly extending fingers 59 which guide the upper end of the slip 55 as the latter is inserted in the machine. An ink ribbon 60 passes around the type carriers 50, guide rollers 61 and an absorbent ink roller 62. This ribbon is fed intermittently upon each operation of the machine by a raised portion 62 of a drum 63 which raised portion impinges the ribbon 60 between it and a roller 64 during each rotation of the drum 63, the roller 64 being suitably mounted upon the printer frame. The drum 63 is secured to the shaft 65 which is given a complete rotation upon each operation of the machine.

While the machine is shown as being operated by a crank handle 66, it is to be understood that any of the well known power devices may be employed. The handle is provided with a suitable pinion, not shown, which drives a large intermediate gear 67, and which intermediate gear through gears 68 and 69 rotates the shaft 65 as fully shown in the aforementioned patents, the gear 69 being secured to the shaft 65.

Secured to the shaft 65 is a collar 71 (Fig. 10), provided with shoulders 72 and 73, which coöperate with shoulders 74 and 75, respectively, of a hub 76 of a cam disk 77, which is loosely mounted upon the shaft 65. Upon the rotation of the shaft the shoulder 72 of collar 71 secured to said shaft will contact with the shoulder 74 of the hub 76 of the cam disk 77 and rotate the latter with the shaft 65. As this cam disk 77 is rotated, it will lower a pitman 78 by means of a roller 79 projecting from said pitman riding upon the surface of the cam 77. The lower end of this pitman 78 is connected to a lever 80, which is pivoted upon a rod 81 at its rear end and at its forward end carries a platen 88. A spring 89, the ends of which are connected to the platen lever 80 and a part of the frame work of the machine, keeps the roller 79 of the pitman 78 in constant contact with the surface of the cam disk 77. While the type carriers are being adjusted, the roller 79 of the pitman 78 rides upon the surface of the disk 77 and after said type carriers have been adjusted, the roller 79 will pass into a reduced portion 90 of the disk 77 under stress of the spring 89, thereby permitting the platen 88 to take an impression from the type carriers upon the slip 55, which is the uppermost one of the two slips inserted. Immediately after the taking of this impression, the slip 55 is fed forward, as hereinafter described, and the roller 79 is engaged by a projection 91 of the cam disk 77, by which the pitman 78 will be lowered and the platen lever 80 rocked about the rod 81. After the cam projection 91 passes away from the roller 79, the spring 89 will force the platen into contact with the type carriers to take an impression upon the second slip 56, it being understood that the slip 55 has previously been fed forward.

It will be noticed that there is a slight lost motion between the shoulders 73 and 75 of the collar 71 and hub 76, respectively, which lost play permits the platen 88 to deliver a sudden blow to the type carriers in order to take a good impression upon the slip from said type carriers. If the cam disk 77 were fastened to the shaft 65, said shaft could be so rotated that the roller 79 would slowly pass into the reduced portions of the cam and thereby prevent the taking of a legible impression from the type carriers.

The ratio of the gearing between the operating handle 66 and the shaft 65 is such that for each two rotations of the handle 66, the shaft 65 will be given a complete rotation, while the large intermediate gear will be given only a half of a rotation. Formed in the side of this intermediate gear 67 is a double cam groove 92 in which plays a roller 93 projecting approximately from the center of a plate 94. The upper end of this plate is provided with an elongated slot 95 through which extends the stub shaft 96 upon which the gear 67 is mounted. The lower end of this plate 94 is provided with a rack portion 97, which meshes with a pinion 98 secured to an arm 99 loosely mounted upon a stud 100 projecting from the side frame 15 of the machine. At its lower end this arm 99 is provided with a lateral extension 101 to which is secured a piece of rubber 102 or some other suitable resilient material. The shape of the cam groove 92 is such that upon each half rotation of the gear 67, which is equivalent to a complete operation of the machine, the arm 99 will be oscillated by the rack plate 94. This plate 94 is guided at its lower end by a roller 103 projecting from the side frame of the machine.

A feed roller 104 is mounted upon the outer end of arm 105 which is secured to a rock shaft 106, this roller being arranged to coöperate with the rubber plate 102 secured to the lateral extension 101 of the arm 99, as hereinafter described. Secured to and extending upwardly from the rock shaft 106 is an arm 107 to the upper end of which is connected the forward end of a pitman 108, the rearward end of the latter being bifurcated so as to straddle the shaft 65. Projecting from the pitman 108 near its bifurcated end is a roller 109 which extends into the cam groove 110 formed in the disk secured to the drum 63. The shape of the groove 110 is such that the shaft 106 is rocked through the pitman 108 so as to bring the roller 104 into the path of the movement of the rubber plate 102 carried by the oscillatory arm 99, so that the slip 55 will be impinged between the plate 102 of the roller 104 and by the continued movement of the arm carrying the platen 102 will advance the slip 55 after an impression has been taken thereon. Immediately after the slip

55 has been fed forward, the roller 104 is lowered so that the rearward movement of the arm 99 carrying the rubber plate 102 will not return the slip 55 to interfere with the taking of an impression upon the second slip 56.

In pay-cashier systems, that is, where the customer receives a check or sales slip from the clerk waiting upon her, which check or slip is to be tendered for payment at the cashier's desk located in another part of the store, proprietors have discovered that amounts printed upon the check or slip have frequently been altered and in order to reduce to a minimum this danger of alteration, the amount type carries are constructed as follows: Engraved in juxtaposition to each of the digits of the amount type carriers, as plainly shown in Fig. 4$^A$ and by the impression taken upon the sales slip 55 in Fig. 11, is a word designating the numerical value as well as a word designating the denomination to which the digit belongs. From this it will be seen that it is necessary to alter the word or character designating the digit, as well as the digit itself to avoid detection which reduces the chances of successful alteration to a minimum.

Motion is imparted to the previously mentioned shaft 29 from the operating handle 66 by an intermediate gear 130, which meshes with the gear 68 and a gear 131 secured to the shaft 29.

While the form of mechanism herein shown and described is admirably adapted to fulfil the objects primarily stated, it is to be understood that it is not intended to confine the invention to the one form of embodiment herein shown and described but that it is susceptible of embodiment in various forms all coming within the scope of the claims which follow.

What is claimed is:

1. In an accounting machine, the combination with accumulating elements, of actuators therefor, combined transfer and locking disks for the accumulating elements, and means for rotating said disks, the latter having cut away portions which permit the operation of the accumulating elements by the actuators.

2. In an accounting machine, the combination with accumulating elements, of actuators therefor, a rotary shaft, and combined transfer and locking disks for the accumulating elements mounted upon said shaft, the disks having cut away portions which permit the operation of the accumulating elements by the actuators.

3. In an accounting machine, the combination with accumulating elements, of actuators therefor, a shaft, means for rotating said shaft, combined transfer and locking disks for the accumulating elements carried by the shaft, the disks having cut away portions which permit the operation of the accumulating elements by the actuators, and means actuated by the accumulating elements during the actuation thereof by the actuators for shifting the disks so as to bring the transfer portions thereof into operative relation with the accumulating elements of higher denomination.

4. In an accounting machine, the combination with accumulating elements, of actuators therefor, a shaft, means for rotating said shaft, combined transfer and locking disks for the accumulating elements carried by the shaft, the said disks having cut away portions which permit the operation of the accumulating elements by the actuators during the rotation of the disks, means actuated by the accumulating elements for shifting the disks so as to bring the transfer portions thereof into operative relation with the accumulating elements of higher denominations, and means for restoring the disks to normal position.

5. In an accounting machine, the combination with accumulating elements, of normally inoperative transfer devices between said elements, means actuated by the accumulating elements for shifting the transfer devices into operative relation with the accumulating elements of higher denominations, a shaft carrying said devices, means for rotating the shaft to effect the transfers, and a laterally movable shaft for restoring the shifting means and thereby the transfer devices to normal position.

6. In an accounting machine, the combination with accumulating elements, of normally inoperative transfer devices between said elements, means actuated by the accumulating elements for shifting the transfer devices into operative relation with the accumulating elements of higher denominations, a shaft having the transfer devices splined thereto, means for rotating the shaft for effecting the transfers, a second shaft having the shifting means splined thereto, and means for rocking the second shaft and shifting it for the purpose of restoring the shifting means and thereby the transfer devices to normal position.

7. In an accounting machine, the combination with type carriers, of a platen, means for operating the platen for the purpose of taking an impression from the type carriers upon a plurality of slips, and means for feeding one of the slips after an impression has been taken thereon, said feeding means comprising an oscillatory frame coöperating with a roller to grip and feed said slip.

8. In an accounting machine, the combination with type carriers, of a platen for taking an impression upon a slip from the type carriers, and means for feeding the slip comprising an oscillatory frame coöperating with a roller to grip and feed said slip.

9. In an accounting machine, the combination with type carriers, of a platen for taking an impression upon a slip from said type carriers, means for feeding the slip comprising an oscillatory frame and a roller, the latter being normally out of the path of movement of the frame, and means for moving the roller into the path of the movement of said frame.

10. In an accounting machine, the combination with an operating mechanism, of a printing couple comprising a type carrier and a platen constructed to be brought together a plurality of times by a single operation of the operating mechanism for the purpose of taking impressions upon a plurality of loosely inserted slips, guides constructed to prevent friction between the slips when one of the slips is moved, and means actuated by the operating mechanism for feeding one of the slips after an impression has been made thereon for the purpose described.

11. In an accounting machine, the combination with an operating mechanism, of a printing couple comprising a platen and a type carrier constructed to be brought together twice during a single operation of the operating mechanism for the purpose of taking an impression upon each of a pair of loosely inserted overlapping slips, guides constructed to prevent friction between the slips when one of the slips is moved, and means for feeding one of said slips after an impression has been made thereon for the purpose described.

12. In an accounting machine, the combination with an operating mechanism, of a printing couple comprising a platen and a type carrier constructed to be brought together twice during a single operation of the operating mechanism for the purpose of taking an impression upon each of a pair of overlapping slips, and means including a roller and a reciprocatory frame for feeding one of said slips after an impression has been made thereon for the purpose described.

13. In an accounting machine, the combination with an operating mechanism, of a printing couple comprising a platen and a type carrier constructed to be brought together twice during a single operation of the operating mechanism for the purpose of taking an impression upon each of a pair of overlapping slips, one of said slips being inserted from the front of the machine and the other of said slips from the side of the machine, normally inoperative devices for feeding the slip inserted from the front of the machine, and means actuated by the operating mechanism for rendering the feeding devices operative after an impression has been made upon the slip inserted from the front of the machine.

14. In a machine of the class described, the combination with an invariably rotated shaft, of a disk mounted on said shaft and carrying a cam, a driving connection between the shaft and disk whereby the latter is permitted to rotate slightly independent of rotations of the former, a platen, an arm operated by the cam on the disk to move the platen in one direction, a spring throwing the platen in the other direction when the arm is released by the aforesaid independent rotation of the disk preventing the cam from retarding the action of said spring.

15. In a machine of the class described, the combination with a series of rotatable accumulator elements each having a peripheral groove open at one end, the open end being formed as a cam, transfer devices normally in ineffective positions and movable laterally to effective positions, a series of laterally movable arms permanently connected to impart lateral movement to the transfer devices and having projections normally in engagement with the aforesaid grooves whereby a complete rotation of an accumulator element will cause the cam portion of the groove to actuate the arm to move the transfer device to effective position, means for actuating the transfer devices to effect the transfers, means for rocking the arms to raise the projections thereon to clear the peripheries of the accumulator elements and then lowering them, and means for shifting the arms laterally while the projections are raised so that when lowered the projections will be reëngaged with the grooves in the accumulator elements.

In testimony whereof I affix my signature in the presence of two witnesses

MAX JACOB.

Witnesses:
Woldemar Haupt,
Henry Hasper.